United States Patent [19]

Eertink

[11] Patent Number: 4,526,461
[45] Date of Patent: Jul. 2, 1985

[54] COPYING MACHINE CONTROL SYSTEM

[75] Inventor: Bastiaan B. B. Eertink, Grubbenvorst, Netherlands

[73] Assignee: Océ-Nederland B.V., Venlo, Netherlands

[21] Appl. No.: 432,835

[22] Filed: Oct. 5, 1982

[30] Foreign Application Priority Data

Oct. 8, 1981 [NL] Netherlands .................. 8104591

[51] Int. Cl.$^3$ .................. G03G 15/00; G03G 21/00
[52] U.S. Cl. .................. 355/14 R; 355/8
[58] Field of Search .................. 355/3 R, 8, 11, 14 R

[56] References Cited

U.S. PATENT DOCUMENTS

| 3,746,957 | 7/1973 | Forster et al. | 318/696 |
| 4,058,359 | 11/1977 | Urselmann | 355/109 |
| 4,270,860 | 6/1981 | Tsuda et al. | 355/14 R |
| 4,280,763 | 7/1981 | Arai et al. | 355/14 R |
| 4,287,461 | 9/1981 | Promis et al. | 355/8 X |
| 4,332,461 | 6/1982 | Cail et al. | 355/8 X |

FOREIGN PATENT DOCUMENTS 1588313 12/1970 Fed. Rep. of Germany .
2008494  6/1979 United Kingdom .

Primary Examiner—Fred L. Braun
Attorney, Agent, or Firm—Albert C. Johnston

[57] ABSTRACT

A copying machine control system employs a synchronous motor driven synchronously with an AC supply voltage to transport a surface on which an image is formed. At least one stepping motor is employed discontinuously to transport an original containing material to be copied at a speed which produces an image moving at the same speed as the surface where the image is formed. A stepping motor controller programs an acceleration profile for the stepping motor to permit it to be accelerated to running speed in a precisely defined manner so that the position of the original is always accurately known. The stepping motor controller derives its control pulses from the same AC voltage which drives the synchronous motor and thus, the original and the image surface are accurately driven in synchronism. A transport speed of the original is in inverse proportion to the imaging ratio. In one embodiment, a second stepping motor is driven with a signal derived from the same AC voltage with a precisely determined acceleration profile for aiding in the initial positioning of the original at the start of each copying cycle.

14 Claims, 17 Drawing Figures

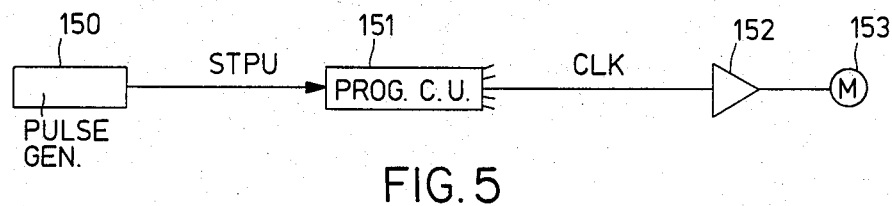
FIG. 5
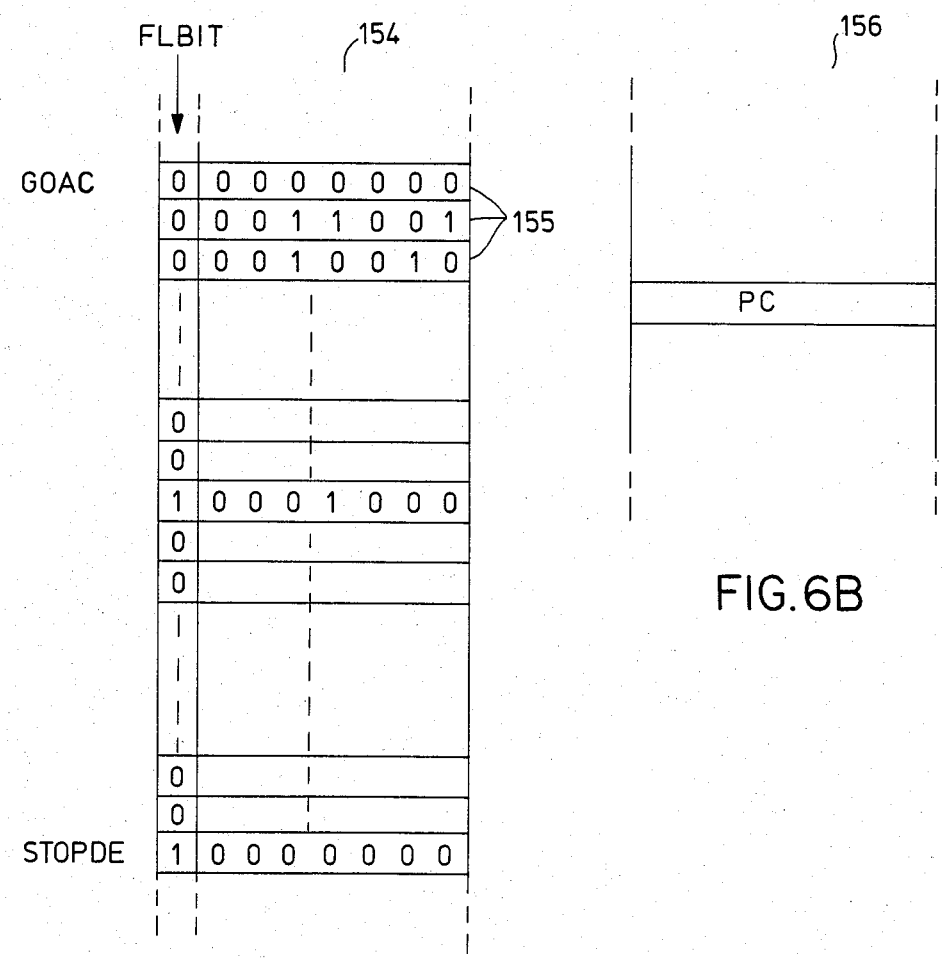
FIG. 6A
FIG. 6B

|  | A | DUP |
|---|---|---|
| 0    | 0 0 0 0 0 0 0 0 0 0 0 | 1 0 0 |
| 1    | 0 0 0 0 0 0 0 0 0 0 1 | 0 0 1 |
| 2    | | |
| ⋮    | | |
| 168  | 0 0 0 1 0 1 0 1 0 0 0 | 0 0 1 |
| 169  | 0 0 0 1 0 1 0 1 0 0 1 | 0 0 0 |
| 272  | 0 0 1 0 0 0 1 0 0 0 0 | 0 0 0 |
| 273  | 0 0 1 0 0 0 1 0 0 0 1 | 0 0 1 |
| 336  | 0 0 1 0 1 0 1 0 0 0 0 | 0 0 0 |
| 337  | 0 0 1 0 1 0 1 0 0 0 1 | 0 0 1 |
| ⋮    | | |
| 2022 | 1 1 1 1 1 1 0 0 1 1 0 | 0 0 0 |
| 2023 | 1 1 1 1 1 1 0 0 1 1 1 | 0 0 1 |
| 2024 | 1 1 1 1 1 1 0 1 0 0 0 | 0 0 1 |
|      | 1 1 1 1 1 1 0 1 0 0 1 | 0 1 1 |
|      | 1 1 1 1 1 1 0 1 0 1 0 | 0 1 0 |
|      | 1 1 1 1 1 1 0 1 0 1 1 | 0 1 0 |
|      | 1 1 1 1 1 1 0 1 1 0 0 | 0 1 0 |
|      | 1 1 1 1 1 1 0 1 1 0 1 | 0 1 0 |
|      | 1 1 1 1 1 1 0 1 1 1 0 | 0 1 0 |
| 2031 | 1 1 1 1 1 1 0 1 1 1 1 | 0 1 1 |

COPYING MACHINE CONTROL SYSTEM

The present invention relates to copying machines and, more particularly, relates to control systems for copying machines for the transport of image receiving surface and an original containing a pattern to be copied.

A conventional copying machine has a surface upon which an image derived from an original is formed. The surface is conveyed past a number of processing stations using at least one synchronous motor. An original conveyor transports the original past an optical system in synchronism with the surface, using at least one other synchronous motor.

One way of controlling motion of the original in a copying machine includes counting pulses generated in synchronism with the movement of the image surface element. However, synchronization of the transport of the original with the control of the processing stations results in a complex control system. U.S. Pat. No. 4,058,359 (Netherlands Patent Application No. 7301199) discloses a system for positioning a leading edge of an original against the nip of stationary conveyor rollers to form a bulge in the original which aids in positioning the original at the start of each copying cycle.

Laid-open Netherlands Patent Application No. 7704160 discloses determining the positions of front and rear edges of an original by counting pulses from a pulse generator.

U.S. Pat. No. 3,917,396 and laid-open Netherlands Patent Application No. 7,704,160 disclose controlling processing stations in a copying machine using pulses produced by a pulse generator driven in synchronism with a photoconductive medium in a copying machine. When a specific number of pulses have been counted since a starting event, an action associated with the counted number is performed.

The object of this invention is to provide a copying machine having a simplified control system.

According to the invention, a control system controls the processing stations of a copying machine in dependence on a frequency of an AC source. An image element surface is driven by a synchronous motor fed by the AC source. A pulse-generator circuit produces a pulse signal whose frequency is integrally related to the frequency of the AC source. The pulse signal drives an original transport mechanism employing a second synchronous motor. Since the speeds of both synchronous motors are rigidly synchronized to a single AC source, the copying machine is controlled by counting the pulses of a single pulse-generator circuit while maintaining complete synchronism between the movement of the original and the movement of the image element. Preferably, at least one of the synchronous motors is a stepping motor and the output of the pulse-generator circuit is connected to means which generate signal pulses to control the at least that one stepping motor in response to the pulses.

The copying machine may be provided with a programmable control system having at least one interrupt input for interrupting a current program in response to an interrupt pulse. The interrupt pulse gives priority treatment to an interrupt program which provides precise control of the at least one stepping motor. The copying machine also includes a conveyor for an original to be copied and a conveyor for an image element upon which an image derived from the original can be formed. Preferably, each of the conveyors is driven by a synchronous motor. First and second interrupt pulses are generated in synchronism with the conveyance of the original, and in synchronism with the conveyance of the image element respectively. A source delivers a signal with a first AC voltage component to a controller effective to derive a control signal for each of the synchronous motors. The control signals contain an AC voltage component whose frequency is always proportional to the frequency of the first AC voltage component of the source signal and the AC voltage component of one of the control signals forms the interrupt pulses.

Consequently, the entire programmable control system can operate with one source of interrupt pulses without losing synchronization of the conveyance of the original and the conveyance of the image element and without jeopardizing control of the copying machine processing stations.

According to an aspect of the present invention, there is provided a copying machine, comprising an image receiving medium, an alternating current power source having a substantially constant first frequency, first means for transporting the receiving medium at a first speed synchronously with the first frequency, an optical system having at least one imaging ratio, means for producing a signal having a second frequency, the second frequency being integrally related to the first frequency, second means for transporting an original along a path at a second speed synchronously with the second frequency, and a ratio between the first and second speeds being in inverse relationship to the at least one imaging ratio.

The above, and other objects, features and advantages of the present invention will become apparent from the following description read in conjunction with the accompanying drawings, in which like reference numerals designate the same elements.

Figure 4A:
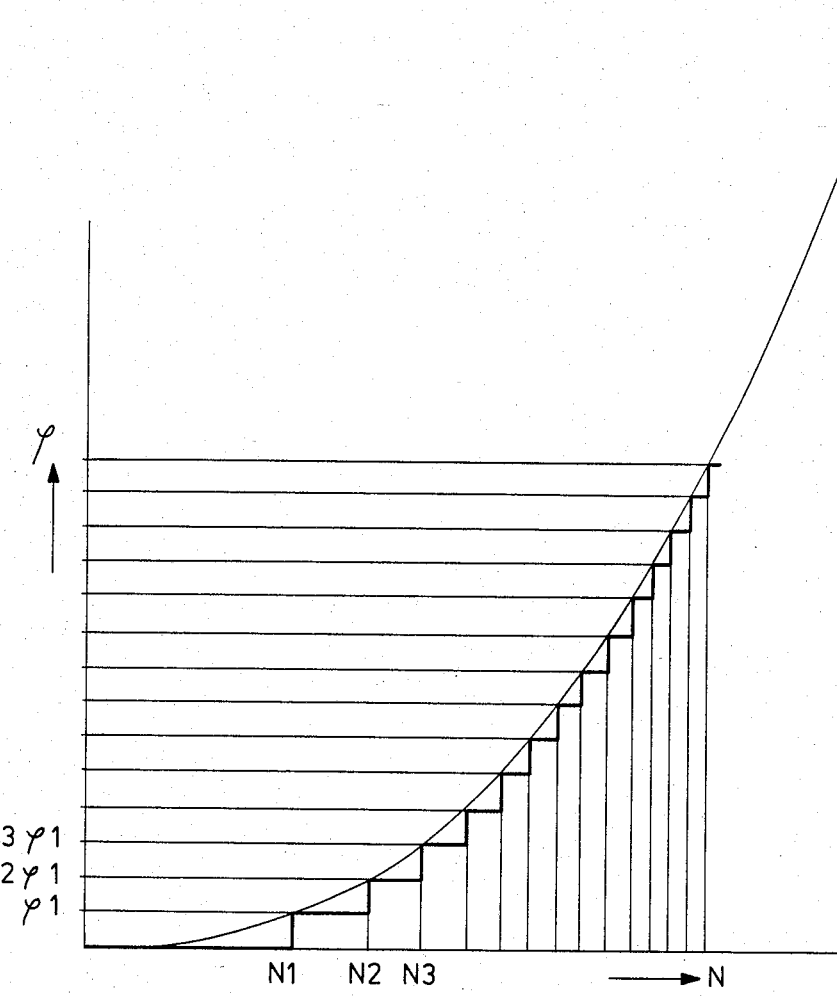
Figure 4B:
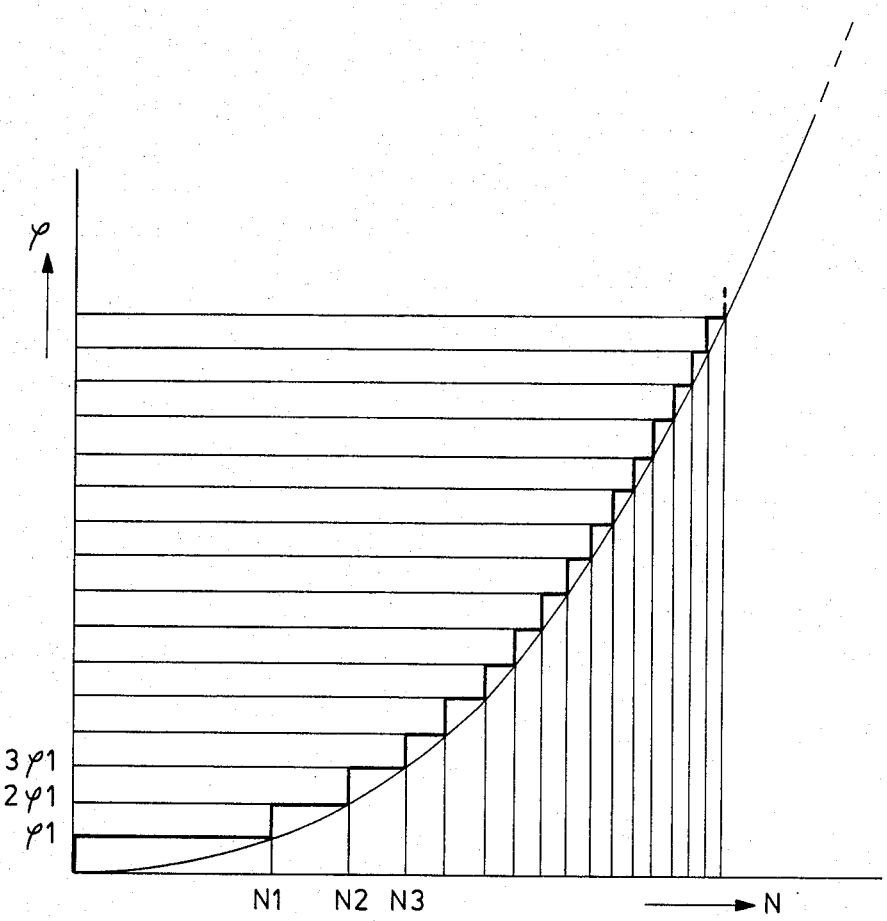
Figure 4C:
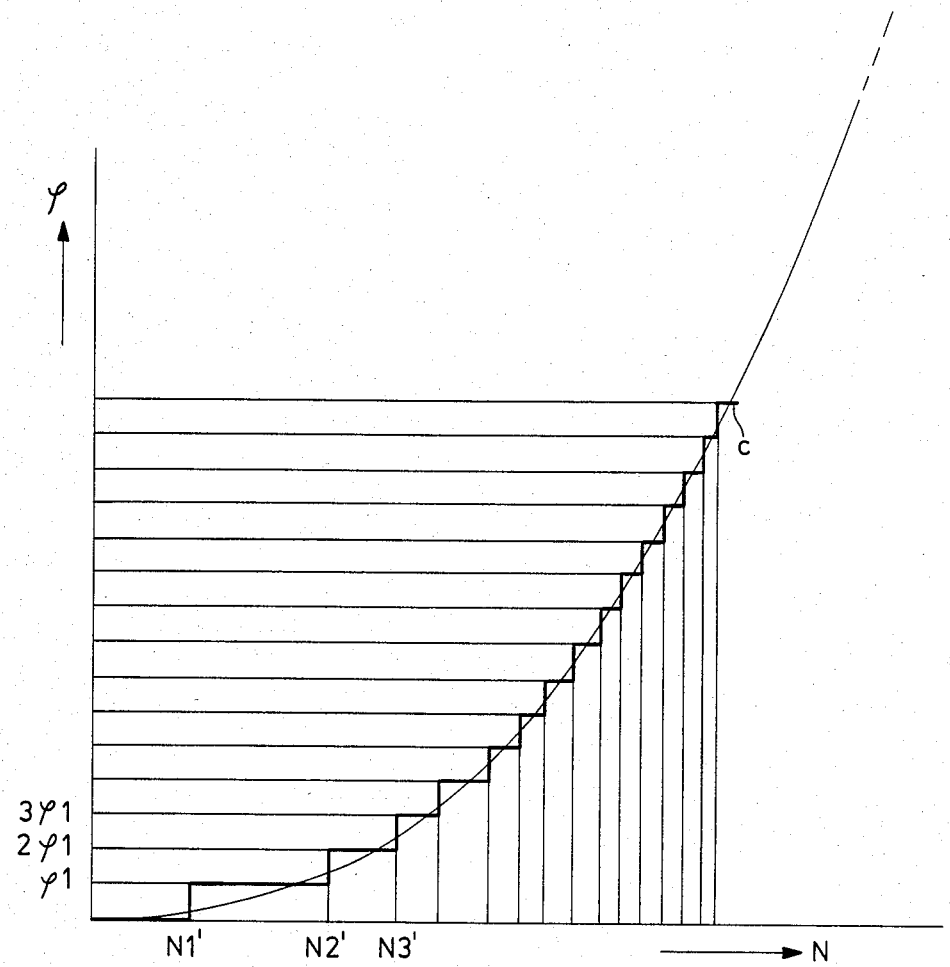

FIGS. 4A to 4C inclusive illustrate three ways in which the contents of the memory locations can be determined to produce a desired acceleration profile.

FIG. 5 is a block diagram of a second embodiment of a control device according to the invention.

FIG. 6A shows part of a memory used in a device according to FIG. 5.

FIG. 6B shows another part of a memory used in a device according to FIG. 5.

Figure 7:
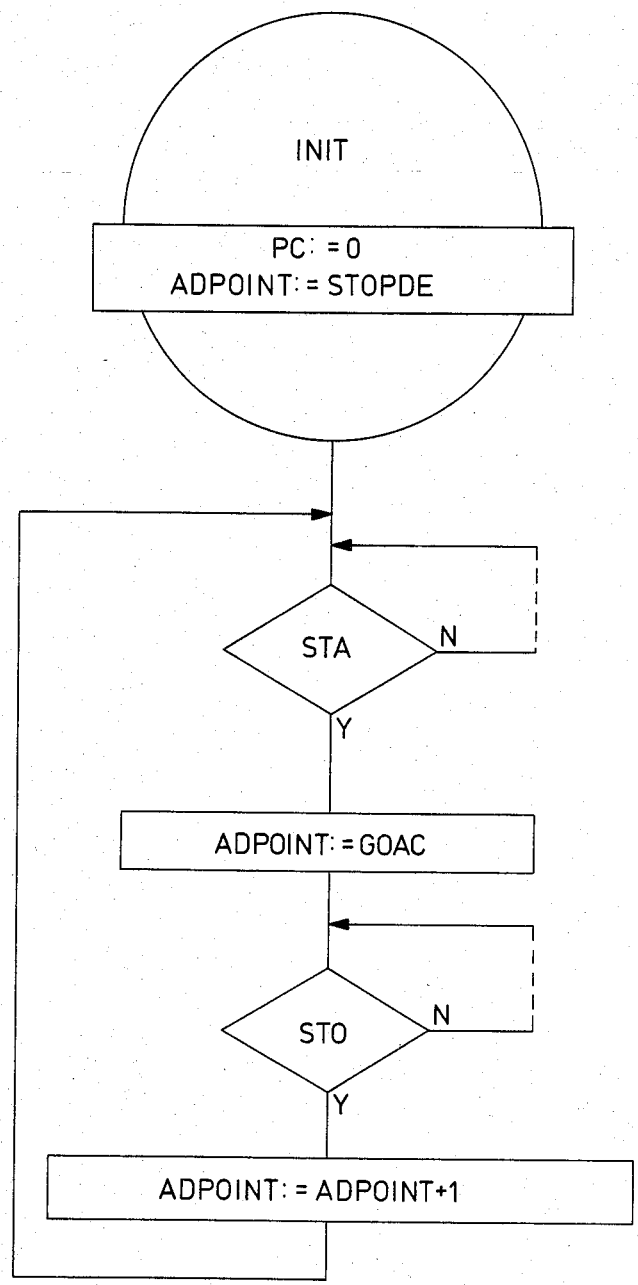

FIG. 7 is a flow diagram of a program used in a device according to FIG. 5.

Figure 8:
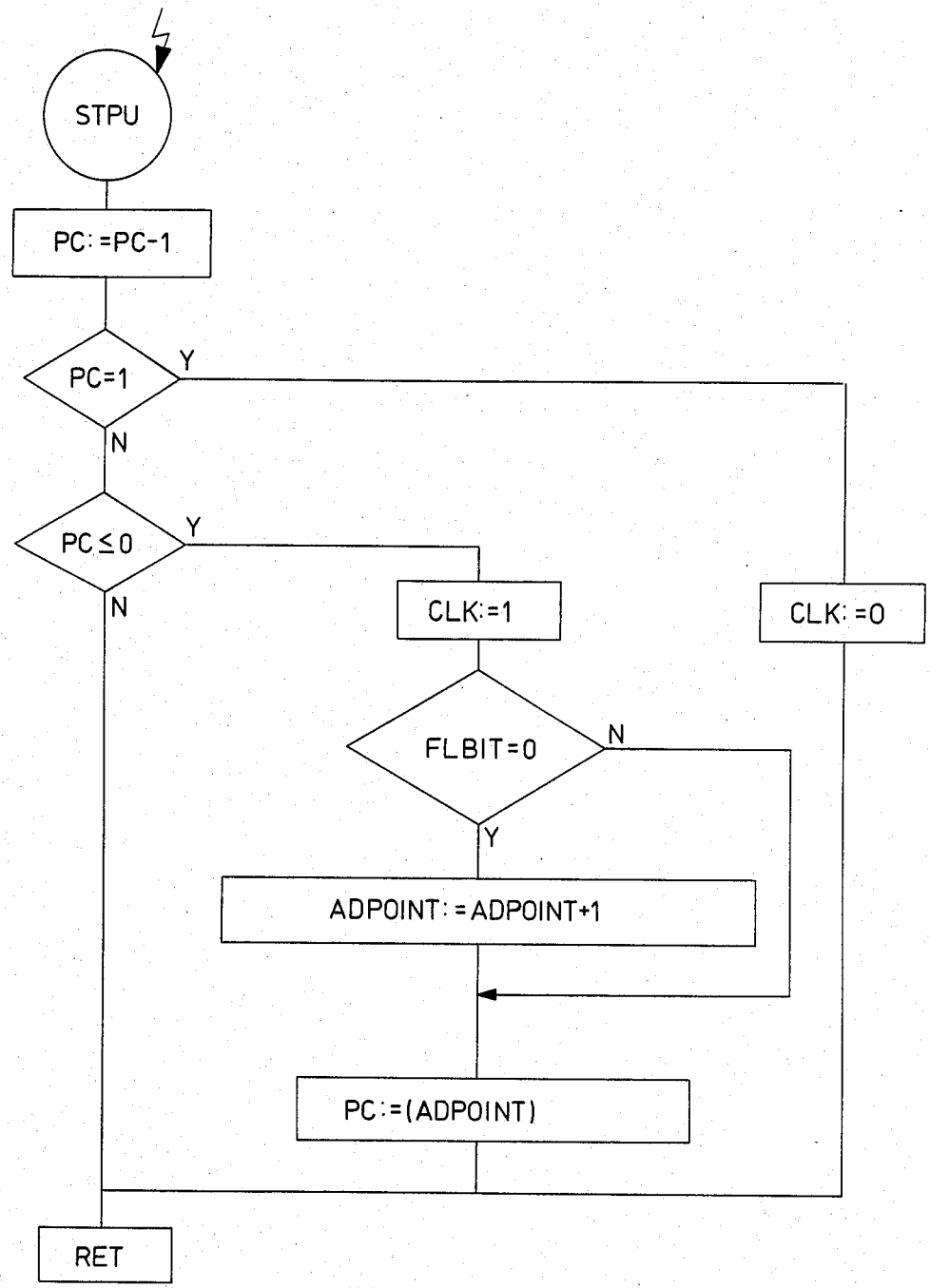

FIG. 8 is a flow diagram of an interrupt program used in a device according to FIG. 5.

Figure 9:
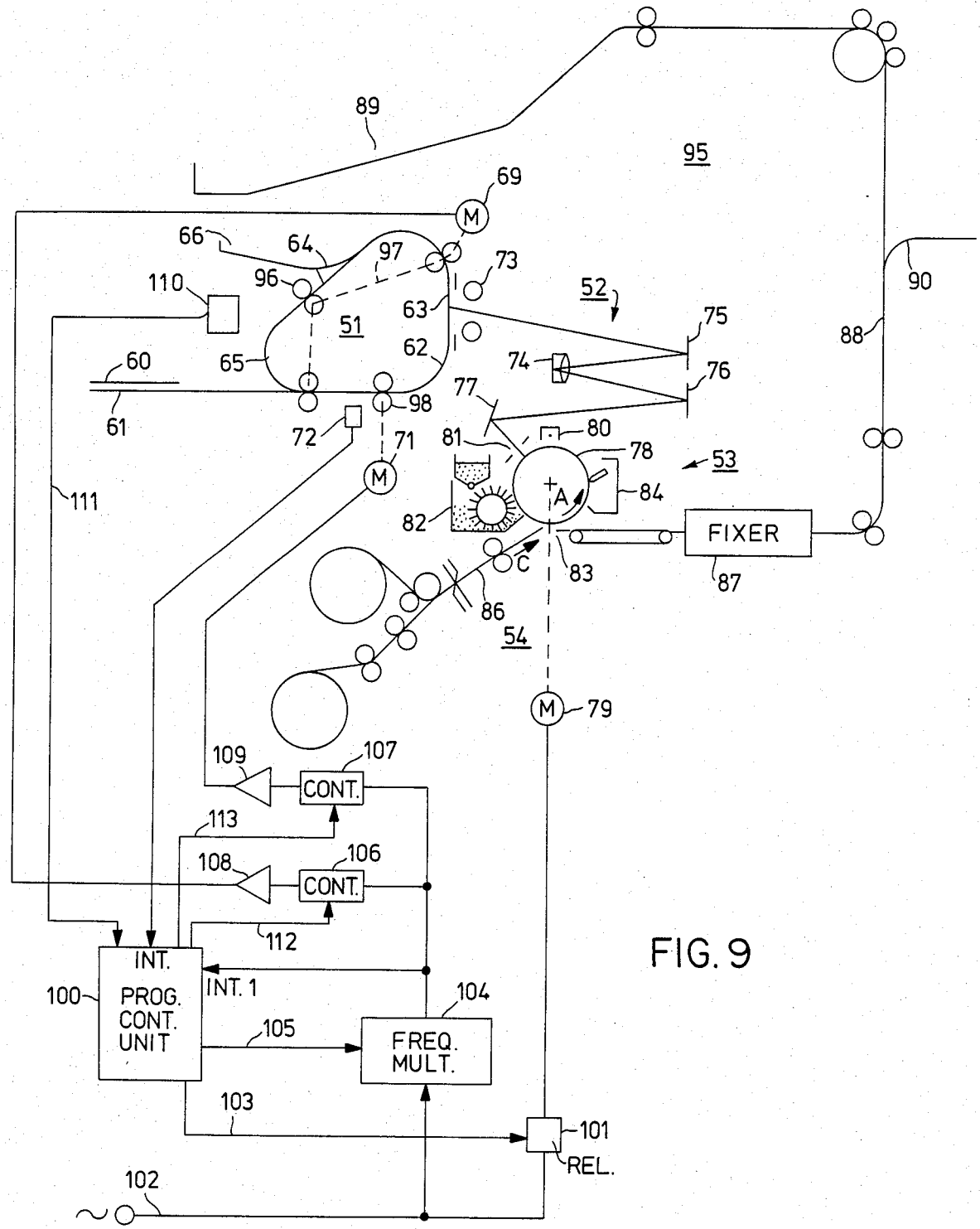

FIG. 9 is a schematic diagram of an electrophotographic copying machine and a block diagram of part of its control system.

Figure 10:
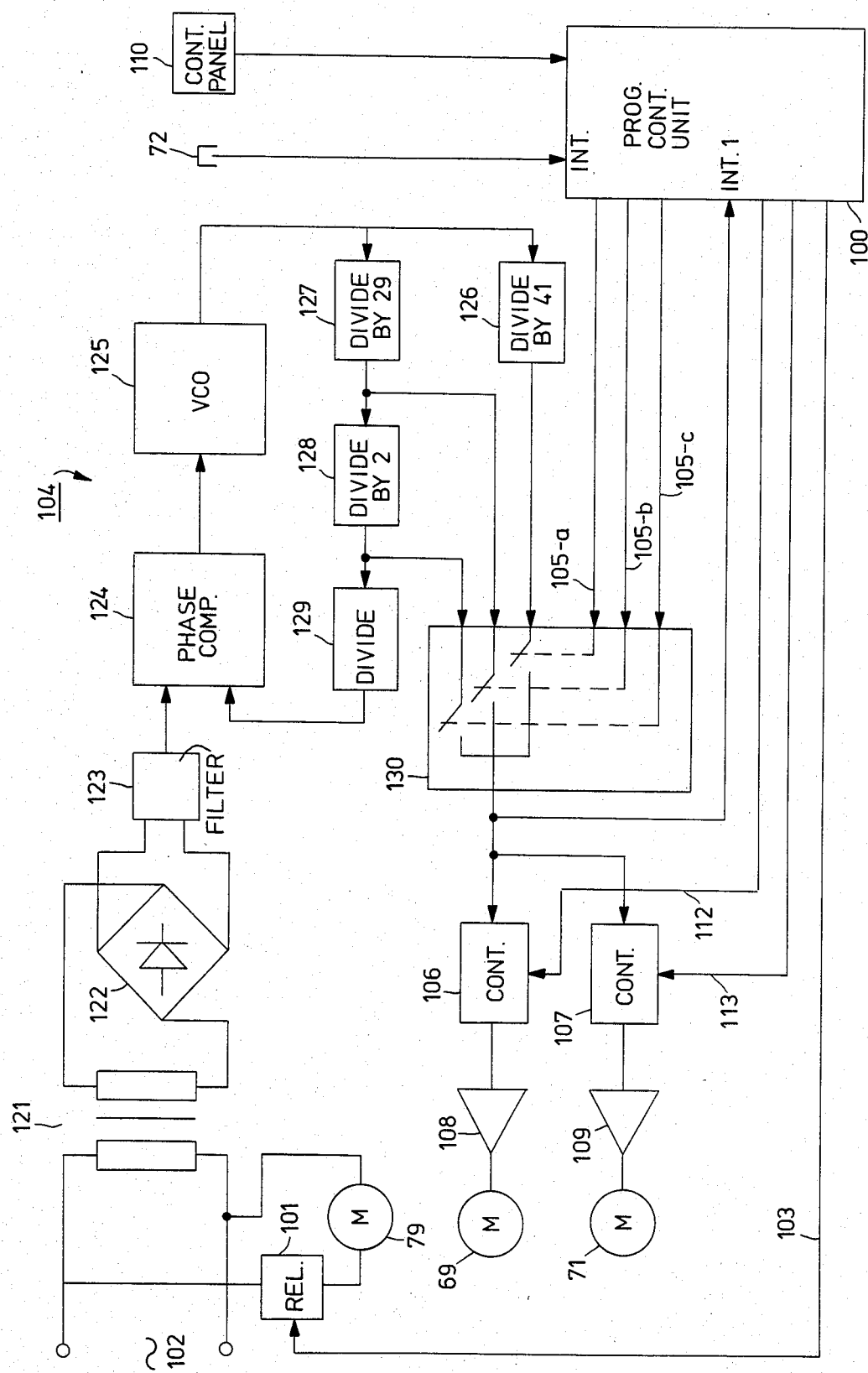

FIG. 10 is a block diagram of the control system for the motors of the copying machine of FIG. 9.

Figure 2:
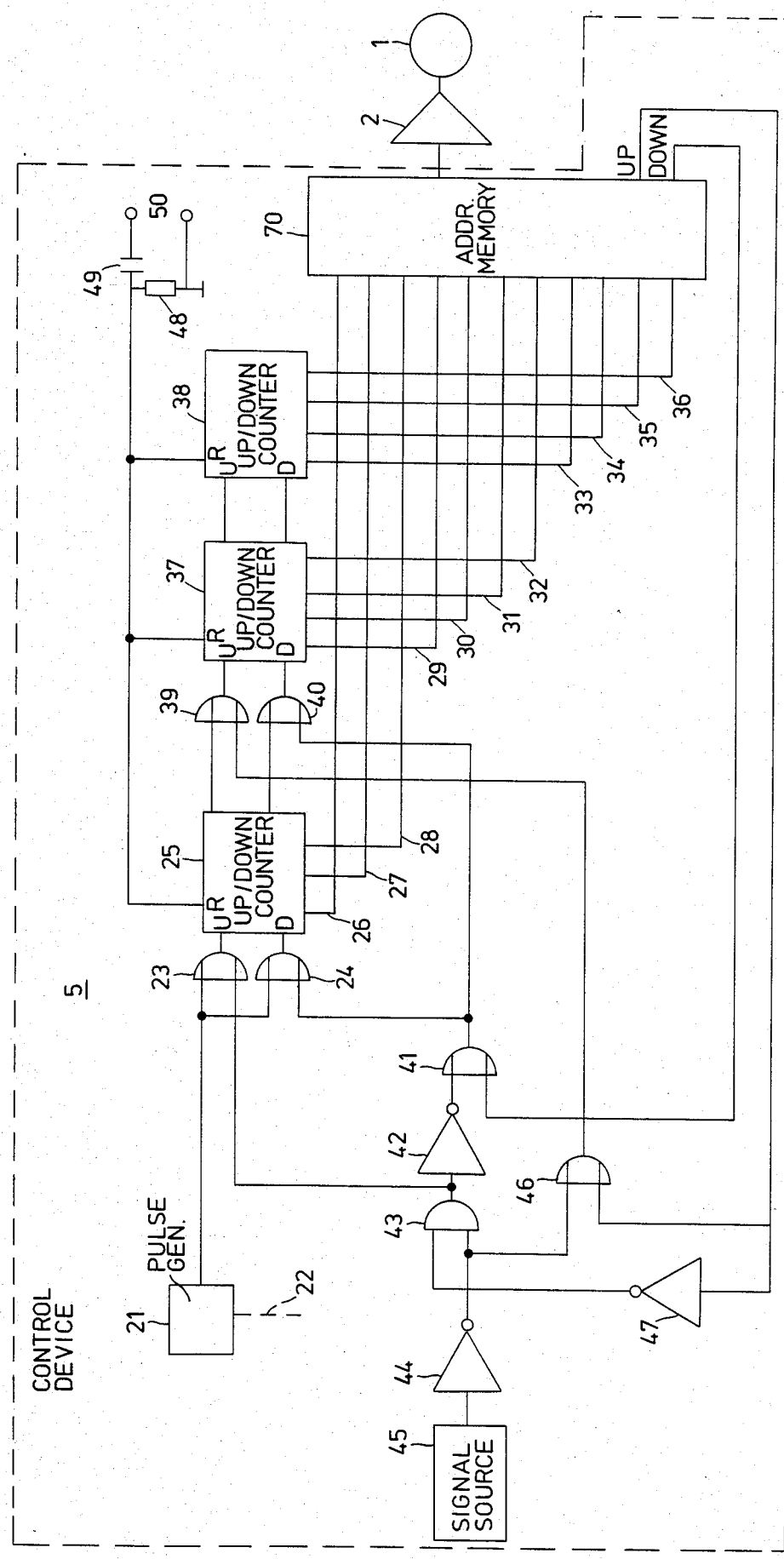
FIG. 2 is a more detailed block diagram of the controller according to an embodiment of the invention.
Figures 2A, 11:
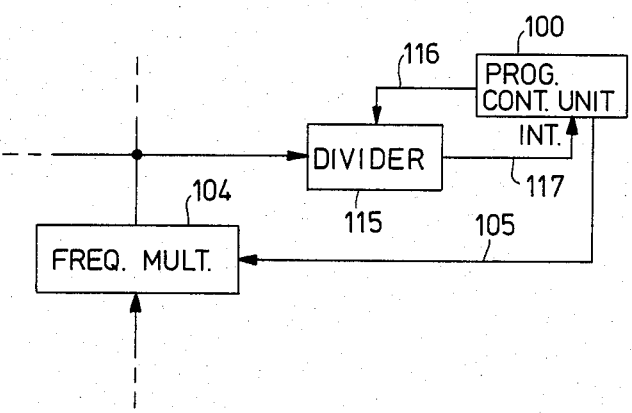
FIG. 2A is an example of the addresses and contents of a number of memory locations of the memory in FIG. 2.

FIG. 11 is a block diagram of a frequency multiplier for the control system shown in FIG. 9.

Figure 1:
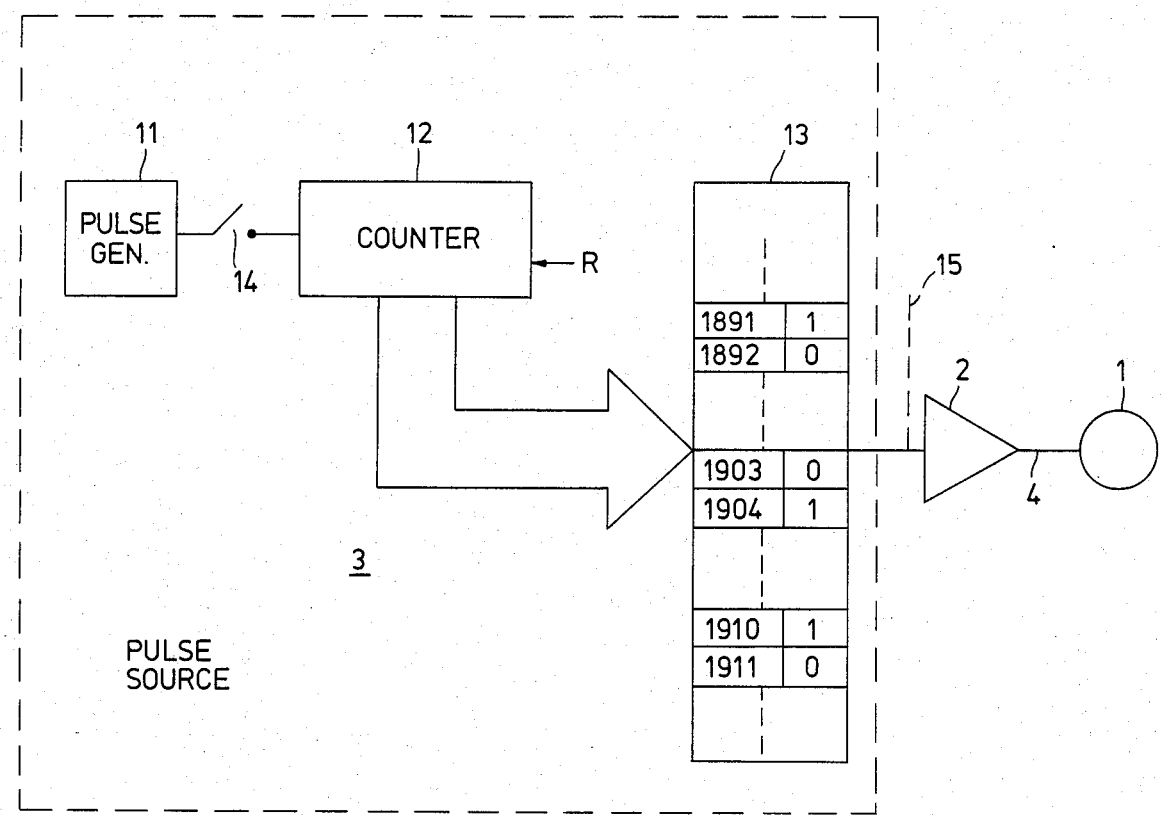
FIG. 1 is a block diagram of a stepping motor controller according to an embodiment of the invention.

Referring to FIG. 1, a stepping motor 1 rotates one step in response to positive-going, or 0-1 transitions of pulses on a line 4 from a power amplifier 2. The pulses are produced by a variable frequency pulse source 3 which includes a fixed-frequency pulse generator 11, a switch 14, a pulse counter 12 and an addressable memory 13. The pulses counted in the pulse counter 12 are presented as a corresponding binary number to the address input of memory 13. Each memory location in the memory 13 contains either a "0" or a number other than "0". The output of the memory 13 is connected to the power amplifier 2. Depending upon the content of a memory location being addressed at a given time, the output signal of memory 13 is either a "0" signal or a signal differing from "0". The memory locations of the addressable memory 13 are arranged in groups with consecutive addresses and with the same content. Groups whose memory location content is equal to "0" alternate with groups whose memory location content differs from "0". The size of the groups decreases with increasing address. In an example, two of such groups are shown in FIG. 1, the group having the addresses 1892 . . . 1903 with "0" as content and a group having the addresses 1904 . . . 1910 with "1" as content. In operation, the content of the pulse counter 12 is preset to a predetermined value, such as zero, by a signal at its reset input R. This binary output of the pulse counter 12 thus accesses a predetermined memory location in the addressable memory 13 and causes the output of the addressable memory 13 to assume a "0" or "1" value according to the value stored in it. The switch 14 applies the output of the pulse generator 11 to the pulse counter 12. The binary number at the output of the pulse counter 12 increases by one for each pulse received from the pulse generator 11. Each time the binary number at its memory input advances by one, the "0" or "1" stored in the next memory location of the memory 13 is addressed and is applied to the power amplifier 2. Thus, the memory locations following the starting memory location are addressed in sequence and their contents are fed to the memory output at a frequency controlled by the frequency of the pulse generator 11.

Figure 1A:
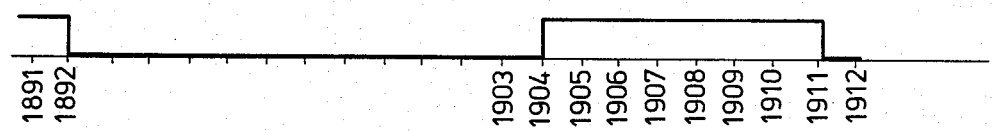
FIG. 1A is a diagram of an output signal of the controller of FIG. 1.

FIG. 1A shows how the signal at the output of the memory 13 changes on consecutive pulses over the memory locations having addresses 1891 ..1912. The output of pulse counter 12 is high or "1" for address 1891. Upon the next input from the pulse generator 12, memory address 1892 is accessed. This location produces low or "0" output. Since the content of memory address 1891 produced a "1" and the content of memory address 1892 produced a "0", the output signal of the memory 13 changes from a "1" signal to a "0". Since the stepping motor 1 responds only to a 0-1 or positive-going transition, no movement of stepping motor 1 is produced at this time. The content of the memory addresses 1893 . . . 1903 is also "0". The output of the memory 13 remains constant at "0" in response to the following 11 pulses from the pulse generator 11 until memory address 1904 is reached. On the next pulse from the pulse generator 11, the output of the pulse counter 12 corresponds to the memory address 1904 which contains a "1". The output of the memory 13 changes from "0" to "1". The change of "0" to "1" is amplified by the power amplifier 2 and fed to the stepping motor 1, which makes one step in response thereto. During the next six pulses from the pulse generator 11, the output signal from the memory 13 remains unchanged since the memory locations 1905 . . . 1910 all contain "1". In response to the next pulse from the pulse generator 11, the output of the memory 13 returns to "0" to match the memory location having the address 1911. Beginning with the starting memory location, the content of each successive memory location is fed to the output of the addressable memory in the manner described above, at the frequency controlled by the pulse generator 11. The contents of addressable memory 13 are divided into groups. A first group of successively addressed memory locations all have the same content, namely, a "0" or a "1". A next group all have the other content. The remaining groups alternate in content. Thus, as the memory addresses are counted up, a sequence of "1"s and "0"s appears at the output of the memory 13 for a length of time dependent on the number of memory locations in the group. For startup of the stepping motor 1, the sizes of the groups of memory locations are initially large and decrease with increasing addresses. As the sizes of the groups decrease, the output has an increasing frequency to smoothly start and accelerate the stepping motor 1. When the stepping motor reaches its running speed, a constant frequency is applied on a dashed line 15 to the power amplifier 2 to maintain the running speed. The constant frequency may be, for example, a direct output of the pulse generator 11.

The stepping motor can be decelerated to a stop in a similar way. For stopping, the memory 13 may contain a second set of groups of memory locations having group sizes which increase with increasing address. The pulse counter 12 may be reset to the first address in this second set of groups. Pulses fed from the pulse generator 11 to the pulse counter 12 produce a signal to the power amplifier 2 which have a decreasing frequency. The decreasing frequency decelerates the stepping motor 1 to a gradual stop in a predetermined manner. Controlled acceleration and deceleration are important in applications where both rapid rotation and very accurate starting and/or stopping positions of the stepping motor 1 are required.

The present invention permits changing the speed of the stepping motor 1. For this purpose, the output frequency of the pulse generator 11 can be made adjustable according to the required speed of the stepping motor 1.

The present invention permits starting the stepping motor 1 using any one of a plurality of different speed profiles. A set of groups of memory locations is established for each speed profile. Each set of groups of memory locations includes a starting address and an end address. To select a speed profile, the pulse counter 12 is preset to the starting address associated with it. The pulse counter 12 traverses the counts from the starting address to the end address to produce the selected starting profile. If the memory 13 is produced as a replaceable integrated circuit, a memory 13 having the desired content may be placed in the system for each speed profile desired.

Referring now to FIG. 2, a control device 5 delivers pulses to a power amplifier 2 feeding a stepping motor 1. In response to each positive-going or 0-1 transition of the signal fed to it, the stepping motor 1 rotates one step. A pulse generator 21 in the control device 5 delivers pulses at a predetermined constant frequency. The pulse generator 21 can be synchronized with another pulse source as shown diagrammatically by dashed line 22, the frequency or phase of which can fluctuate slightly about an equilibrium value over a period of time. Optionally, the pulse frequency of the pulse generator 21 may be preset to a value which drives the stepping motor 1 at a desired speed.

The pulse output of the pulse generator 21 is connected to a first input of a 2-input OR gate 23 and to a first input of a 2-input OR gate 24. The output of the OR gate 23 is connected to the UP input of an UP/DOWN counter 25. The output of the OR gate 24 is connected to the DOWN input of the UP/DOWN counter 25. The UP/DOWN counter 25 is a 3-bit binary counter. The three output bits of the UP/DOWN counter 25 are connected on lines 26, 27 and 28 to the three least significant bits of the address input of an addressable memory 70. The remaining address inputs of memory 70 receive four output bits of a 4-bit UP/DOWN counter 37 connected via lines 29, 30, 31 and 32 and the four output bits of a 4-bit UP/DOWN counter 38 connected via the lines 33, 34, 35 and 36. The UP output of the UP/DOWN counter 25 is connected to a first input of a 2-input OR gate 39. The output of the OR gate 39 is connected to the UP input of the UP/DOWN counter 37. The DOWN output of the UP/DOWN counter 25 is connected to a first input of a 2-input OR gate 40. The output of the OR gate 40 is connected to the DOWN input of the UP/DOWN counter 37. The UP and the DOWN output of the UP/DOWN counter 37 are connected to the UP and the DOWN input of the UP/DOWN counter 38 respectively. The output of a 2-input OR gate 41 is connected to the second input of the OR gate 24 and to the second input of the OR gate 40. The output of a 2-input AND gate 43 is connected through an inventor 42 to a first input of the OR gate 41. The output of the AND gate 43 is also connected to the second input of the OR gate 23. The output of a signal source 45 is connected through an inverter 44 to a first input of the AND gate 43. The signal source 45 delivers a "1" or a "0" signal depending on whether the counters 25, 37 and 38 are to count up or down, that is, whether the stepping motor 1 is to be started and accelerated to running speed or decelerated from running speed and stopped. The output of inverter 44 is also connected to the first input of a 2-input OR gate 46. The output of OR gate 46 is connected to the second input of the OR gate 39. The second input of OR gate 46 receives one of the output bits of the memory 70, which is hereinafter referred to as the UP or U output. The UP output is also connected through the inverter 47 to the second input of the AND gate 43. A second output of memory 70, which is hereinafter referred to as the DOWN or D output, is connected to the second input of the OR gate 41. A third output of memory 70 which is hereinafter referred to as the PULSE or P output, is connected through the power amplifier 2 to the stepping motor 1. The reset inputs R of the UP/DOWN counters 25, 37 and 38 are connected to the junction of a resistor 48 and a capacitor 49 which are connected in series with one another between the poles of a feed voltage source 50 for the control device 5.

Memory 70 should be capable of storing at least 3 bit in each memory location, one bit for the PULSE output, one bit for the UP output and one bit for the DOWN output. A system employing an 11 bit addressing is shown, by way of example. A system according to the invention may exploy more or less than 11 address bits. The UP/DOWN counters 25, 37 and 38 can be, for example, integrated CMOS circuits of the type 40193. The memory 70 can be one or more 8-bit EPROM integrated circuit devices such as, for example, type 2716 made by Intel. The operation of the control device 5 will now be described, reference being made to FIG. 2A in which the address and the content of the DOWN bit D, the UP bit U and the PULSE bit P are shown in respect of a number of memory locations.

By way of example, the PULSE bit P of the group of memory locations whose addresses run from 00000000001 to 00010101000 inclusive that is, 168 contiguous addresses, is equal to "1" and of the adjoining group of memory locations with addresses 00010101001 to 00100010000 inclusive that is, 104 contiguous addresses, is equal to "0". In the next group of addresses beginning with address 00100010001, the PULSE bit is again "1" and so on. The sizes of the groups decrease continuously as the addresses increase. The content of the memory locations having the addresses 11111100110 to 11111101111 inclusive is also shown for reasons which will be apparent from the following.

When the supply voltage is switched on, a pulse formed at the junction of resisror 48 and capacitor 49, resets the UP/DOWN counters 25, 37 and 38 which thereupon produce a "0" signal on output lines 26–36. Memory address 00000000000 in memory 70 hereinafter also referred to as memory location "0" (=zero decimal), is addressed. Memory location "0" contains the DOWN bit which is applied to OR gate 41.

The UP output and the PULSE output are "0". Assuming that the output of the signal source 45 is a "0" signal indicating that the stepping motor should remain stopped, from truth tables for the AND and OR gates at least one of the inputs of each of the inputs of each of the OR gates 23, 24, 39 and 40 receives a "1". Consequently, none of the outputs of the OR gates 23, 24, 39 and 40 can change and hence none of the output signals of the counters 25, 37 and 38 on lines 26, . . . , 36 can change. The existing situation with a "0" memory address is thus maintained and the stepping motor 1 remains stopped.

The signal source 45 produces a "1" signal to start the stepping motor 1 and a "0" signal in order to stop the stepping motor 1 and keep it stopped. Signal source 45 may be a manually operated switch or alternatively may form part of the control system of a device with which the stepping motor 1 cooperates.

A "1" signal at the output of signal source 45 produces a "0" at the output of inverter 44. This inhibits AND gate 43 and applies a "0" to one input of OR gate 23 and to inverter 42. The resulting "1" from inverter 42 enables OR gates 24 and 40 and maintain a "1" at their outputs. Since one of the inputs of the OR gate 23 is a "0", the counter 25 counts up. After the counter 25 has counted one pulse, memory location "1" is addressed. This memory location contains DOWN bit 0, UP bit 0 and PULSE bit 1, hereinafter referred to as 001.

Both the D signal at the DOWN output and the P signal at the PULSE output change in value in response to the first counted pulse. The change of the DOWN output, which is connected only to an input of the OR gate 41, has no effect on the output of the OR gate 41, and hence no effect on the outputs of the OR gates 24 and 40, because the output of the inverter 42 is a "1" at this time. The change of the signal at the PULSE output from a "0" signal to a "1" signal results in the stepping motor 1 rotating one step. The second pulse counted by the counter 25 addresses memory location "2". The content of memory location "2" is the same as memory location "1". The output at the DOWN output, the UP output and the PULSE output remain unchanged up to and including the 168th pulse. When the 169th pulse is counted, memory location "169" is addressed. The content of memory location "169" differs from the content of memory location "168" in that the PULSE bit P is 0. The signal PULSE output changes from a "1" to a "0". Since the stepping motor 1 reacts solely to a 0-1 changeover and is insensitive to a 1-0 changeover, stepping motor 1 remains stationary at this time. This situation does not change up to and including the 272nd pulse.

When the 273rd pulse is counted, memory location "273" is addressed. The content of memory location "273" is the same as the content of memory locations "1", . . . , "168", i.e. 001. The PULSE output changes from a "0" to a "1" and the stepping motor 1 rotates one step. The DOWN output and the UP output remain unchanged. The output signals of the DOWN, UP and PULSE output then remain unchanged until the beginning of the next group of addresses is reached. The size of groups of memory locations decreases with increasing addresses or, at most, are equal to 168, so that the duration of the "1" signal at the PULSE output is shorter than or equal to the duration of the "1" signal that was present at the PULSE output during the pulses 1 to 168, inclusive. The groups of memory locations with consecutive addresses having the same content, such as memory locations "1" to "168", inclusive, and "169" to "272", inclusive, preferably decrease in size with increasing address. Finally, the groups are reduced in size until a group of "0" addresses plus an adjacent group of "1" addresses totals 8 addresses. This gives one output 0-1 changeover per 8 input pulses. This continues until memory location "2023" having a content of 001 is reached. Memory location "2023" conditions the apparatus to assume and retain a constant frequency as long as a "1" remains provided by the signal source 45. The next 8 memory locations "2024" to "2031" inclusive have a special significance. The memory locations "2024" , . . . , "2031" control the speed of stepping motor 1 at a constant final running speed. The content of these memory locations is shown in FIG. 2A. The DOWN bit is "0", and the UP bit is "1" except in memory location "2024". The PULSE bit is 1 in the memory locations "2024", "2025" and "2031" and 0 in the memory locations "2026", . . . , "2030". As a result of gating, only the three least significant address bits from the UP/DOWN counter 25 change value after passing memory location "2023". The "1" at the UP output of the memory 70 holds the OR gate 39 enabled and prevents further advance of the UP/DOWN counters 37 and 38. Since the counts of counters 37 and 38 cannot change and the count of counter 25 can change, the final eight addresses from "2024" to "2031" are repeatedly traversed. The UP output "1" via the inverter 47 inhibits the AND gate 43. The inverter 42 and the OR gate 41 enable the OR gates 24 and 40 to prevent them passing signals to the DOWN inputs of the UP/DOWN counters 25 and 37.

The OR gate 23 still passes pulse signals to the UP input of UP/DOWN counter 25. Consequently, the counting outputs of counter 25 successively traverse the counts 000, 001, 010, 011, 100, 101, 110, 111. It should be noted that to achieve this result, it is not essential for the UP bit in the memory locations "2025", . . . , "2030" to be a 1 but only that the UP bit should be "1" in memory location "2031". This "1" blocks the signal generated by UP/DOWN counter 37.

The following describes a controlled method of stopping stepping motor 1. The memory locations "2024" contains a 0 at the location of the UP bit. Deceleration and stopping of the stepping motor 1 is begun and maintained when the output of the signal source 45 goes to zero.

On repetitively traversing the memory locations "2024", . . . , "2031" the pulse-pause ratio of the pulses at the output of the memory 70 is 3:5 because three of these memory locations carry a "1" and five of these memory locations carry a "0" at the location of the PULSE bit. It is desirable that this 3:5 ratio be preserved at least during the earliest stages of deceleration to avoid an abrupt phase shift in the PULSE signal applied to the stepping motor 1. If the output signal of the signal source 45 goes to zero when one of the memory locations "2025", . . . "2030" is addressed, the UP/DOWN counter 25 is permitted to continue counting up to "2031" to "2024" before beginning to count down. The UP bit of memory locations "2025", . . . , "2030" is a "1". The UP bit thus holds the OR gates 46 and 39 enabled so that UP/DOWN counter 37 remains blocked from counting up. The "1" UP bit applied to the inverter 47 produces a "0" which maintains the AND gate 43 inhibited. The "0" at the output of the AND gate 43 permits the OR gate 23 to continue transmitting pulses and to thus advance the UP/DOWN counter 25. The "1" at the output of the inverter 42 holds the OR gates 41, 24 and 40 enabled so that UP/DOWN counters are prevented from counting down as long as the UP bit is "1". After counting reaches "2031", on the next pulse, the UP/DOWN counter 25 returns count 000, so that memory location "2024" is addressed. The UP bit in memory location "2024" is "0". The output of the inverter 47 enables one input of the AND gate 43. The other input of the AND gate 43 is enabled by the "1" from the inverter 44. The output of the AND gate 43 provides a "1" to inputs of the OR gate 23 and the inverter 42. The OR gates 24 and 40 are now permitted to pass signals to counter 25 and 37 and the OR gates 23 and 39 are enabled at one of their inputs so that they block the signals. The UP/DOWN counters 25, 37 and 38 begin counting down from "2024" to 0 without producing an abrupt phase shift in the signal at the PULSE output of the memory 70. When the count 00000000000 is reached, the DOWN output produces a "1" signal because the content of memory location "0" is 100. This "1" at the DOWN output prevents the OR gates 24 and 40 from passing signals so that counting down is stopped at memory location "0" and the stepping motor 1 remains stopped.

The "0" from the signal source 45, inverted in the inverter 44, along with the "0" from the DOWN output of the memory 70, inverted in the inverter 47, maintains a "1" at the output of the AND gate 43. This prevents pulses being connected through the OR gate 23 to the UP input of the UP/DOWN counter 23.

The control device 5 of FIG. 2 enables a stepping motor to be accelerated to running speed, run, and be decelerated to a stop in a defined manner. A slight modification of the logic circuit between the signal source 45, the UP and the DOWN output and the counter 25, 37 and 38, which would be clear to one skilled in the art without further description, enables a first part of the memory 70 to be used for starting the stepping motor 1 and a second part of the memory to be used for stopping it. The stepping motor 1 can thus be started according to a first speed profile and stopped according to a second speed profile. In the light of the extensive description that has been given with reference to FIG. 2, it is not necessary to describe this modification in detail.

Figure 3A:
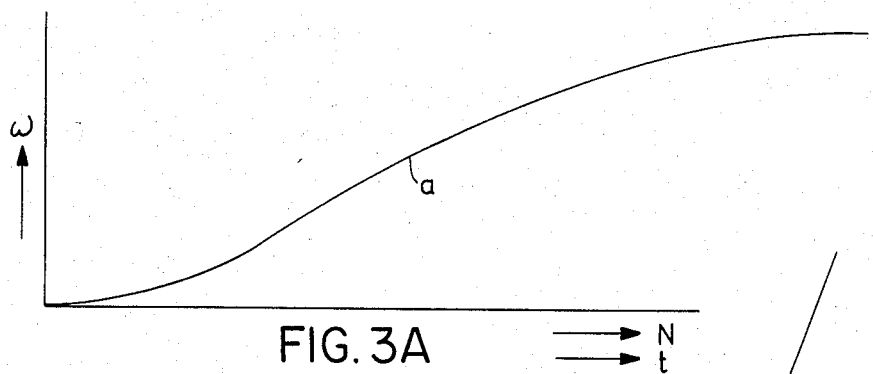
FIG. 3A is a curve showing the relationship between shaft speed and time or number of steps for starting a stepping motor.

FIG. 3A is an example of a speed profile illustrating the required speed of rotation ω against the time t during starting of a stepping motor 1. Curve a is shown as a gradual curve but it should be borne in mind that the speed of rotation ω of a stepping motor at a low ω is an average over a number of steps and has no connection with the speed at which the motor performs the step itself. In applications where it is important to know how the speed of rotation depends upon the angle through which the motor has turned, time t in FIG. 3A can be replaced by the number of pulses N.

Figure 3B:
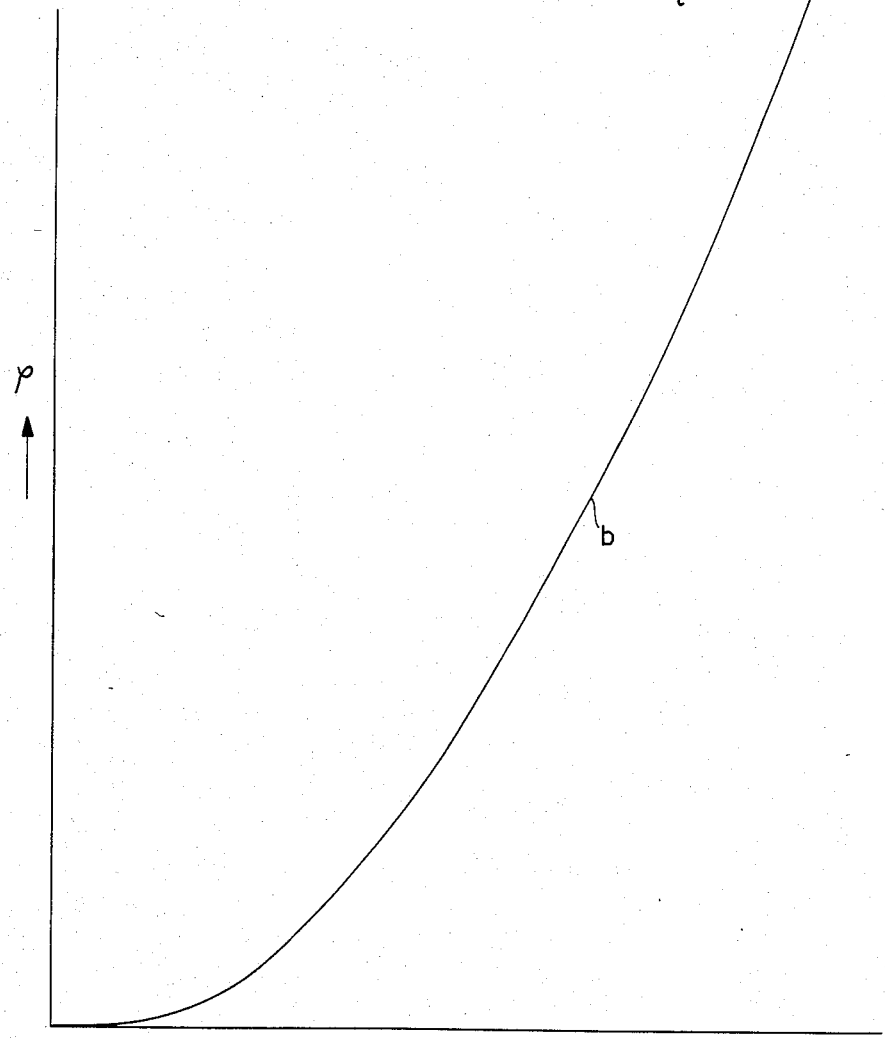
FIG. 3B is a curve showing the relationship between shaft angle and time or number of steps for starting a stepping motor.

FIG. 3B shows the angle φ through which the motor has turned from a starting position against the time t or the number of pulses N if starting is effected as shown in FIG. 3A. Since the frequency of the pulse generator 11 or 21 respectively is predetermined, curve b also represents the relationship between the angle φ through which the motor has turned and the number of pulses N that the pulse generator 11 or 21 respectively has delivered from the beginning of starting.

FIGS. 4A to 4C inclusive show how the content of the memory locations of memory 13 or 70 respectively can be determined in order to obtain the profiles reproduced in FIGS. 3A and 3B. Each transverse line along the vertical axis in FIGS. 4A, 4B and 4C denotes one step of the stepping motor while the number of pulses to be counted is plotted along the horizontal axis. According to FIG. 4A, the first group of memory locations is filled with a 0 and the second group, in which a 1 is placed, starts with memory location N1, so that the first step causes a rotation to φ1. The third group again contains 0 while the fourth group, which again contains a 1, starts with N2, so that the second step again causes a rotation through an angle φ1 to the angle 2φ1, from the starting state. The sixth group starts with N3, and so on.

Similarly, in FIG. 4B, the first step is made at N=1 (similar to the diagram shown in FIG. 2A), and the next steps are made at N2, N3 and so on. In FIG. 4C, the steps are made at N1', N2', N3', so that the curve c which indicates the angle as a frequency of N oscillates around the required curve. It follows from FIG. 4C that the memory locations 0 to N1'−1 inclusive contain a 0. It is of course, also possible to approximate the required curve with the curve c by deducting the value (N1'−1) from the counts N1', N2', N3' shown in FIG. 4C, so that the steps take place at the counts 1, (N2'−N1'+1), (N3'−N1'+1), and so on.

This also applies to the curve in FIG. 4A, the same profile being obtained by having the steps take place at the counts 1, N2−N1+1, N3−N1+1. It should be noted that FIGS. 4A to 4C inclusive show a graphic determination of the counts N at which the stepping motor makes a step.

It will be clear that if the relationship shown by the curve a or b (in FIGS. 3A and 3B respectively) is known in mathematical form, the counts at which the stepping motor must make a step can also be readily calculated.

FIGS. 5, 6, 7 and 8 are examples of how a control device for starting a stepping motor in a defined manner can be embodied by means of a programmable control system.

In FIG. 5, a pulse generator 150 generates pulses STPU at a predetermined frequency. The pulses STPU are counted by a programmable control unit 151. One of the output signals of the control unit is the signal CLK. The signal CLK is the input signal to a power amplifier 152 whose output is connected to a stepping motor 153. The control unit 151 has a memory 154 in which a program requiring to be performed is stored and in which a number of bit patterns 155 are fixed (FIG. 6A). The bit patterns 155 represent numbers of pulses which must be counted by the control unit 151 before the output signal CLK can change its state.

FIG. 6A shows a part of the memory 154. The first address is identified as GOAC and the last address as STOPDE. One of the bits in the memory 154 is identified as a flag bit FLBIT, the meaning of which will be explained in detail in the following description. In addition to the flag bit FLBIT, each of the memory locations contains a number the magnitude of which decreases from memory location GOAC to the memory location in which the FLBIT changes from "0" to "1". The magnitude of the number in the memory locations following the "1" flag bit increases again until reaching the memory location STOPDE.

FIG. 6B shows a section of a read/write memory 156 forming part of the memory of the programmable control unit 151. One of the memory locations PC of the read/write memory 156 acts as a register which keeps track of the count of the number of pulses STPU received by the programmable control unit 151. FIG. 7 shows part of the program which relates to the present invention included in the memory of the programmable control unit 151. An initialization section INIT of the program sets the content of the memory location PC to zero and sets an address pointer ADPOINT equal to STOPDE. A check is then made in the block STA to see whether the stepping motor 153 is to be started. Until a start is renabled by block STA, the control unit 151 can occupy itself with other matters, as shown by the dashed line from the output N to the input of the block STA.

When the control unit 151 receives a signal to start the stepping motor 153, the address pointer ADPOINT is made equal to GOAC and the stepping motor 153 is started in the manner described in detail hereinbelow with reference to FIG. 8. The control unit 151 then checks in the block STO to determine whether the started stepping motor 153 is to be stopped. As long as this is not the case, the control unit 151 can occupy itself with other matters, as shown by the dashed line from the output N to the input of the block STO. If a stop is required, the address pointer ADPOINT which, as will be described hereinafter, stopped at the memory location whose FLBIT is equal to 1, is increased by 1. After the stepping motor is stopped, the address pointer ADPOINT is again at the memory location STOPDE and the control unit 151 is again ready to receive a command to re-start the stepping motor 153.

The STPU pulses from pulse generator 150 are connected to an interrupt input of the programmable control unit 151. Each pulse STPU interrupts the current program and enables the priority runnings of an interrupt program. The priority interrupt program is shown in greater detail in FIG. 8. The content of the memory location PC is reduced by 1. Since the content of the memory location PC is initially set to zero by the initialization routine INIT, reducing it by 1 makes the content of the memory location PC equal to −1 in response to the first interrupt pulse STPU. A check is made in the "PC=1" block to determine whether the content of the memory location PC is equal to 1. Since this is not true, the process is continued via the output N to the block "PC≦0". This is true, and so the output signal CLK is made equal to 1 via output Y. A check is then made to determine whether FLBIT is equal to 0. This is not so because the address pointer ADPOINT points to the memory location with the mark STOPDE, whose FLBIT is equal to 1. The output N of the block "FLBIT=0" bypasses the next block and sets the content of the memory location PC equal to the content of the memory location indicated by the address pointer ADPOINT. In this case, the memory location is the one marked STOPDE, the content of which is equal to zero. Upon exiting the interrupt program, storage location PC contains zero. The program will continue to cycle in this way until a box STA indicates that the stepping motor 153 should be started. The CLK output remains equal to 1 and the amplifier 152 a constant DC voltage signal so that the stepping motor 153 remains stopped.

When the stepping motor 153 must be started, the address pointer ADPOINT is made equal to GOAC. In response to the next interrupt pulse STPU, the content of the memory location PC again becomes equal to −1. Via the output N of the block "PC=1" and the output Y of the block "PC≦0", the signal CLK remains equal to "1". Next, it is determined whether FLBIT is equal to zero. Since the memory location marked GOAC is now addressed, this question is answered in the affirmative and the address pointer ADPOINT is increased by 1 via the output Y of the block "FLBIT=0". As a result, the memory location following the one marked GOAC is now indicated. The content of this memory location is a number, e g. 25, which is then loaded or written in the memory location PC. The number loaded into memory location PC determines the number of succeeding interrupt cycles during which the output signal CLK will be "1". This concludes the interrupt program and the programmable control unit returns to the interrupted program. In response to the next interrupt pulse STPU, the current program is again interrupted and the content of the memory location PC is reduced by 1 from 25 to 24. The question whether the content of the memory location PC is equal to 1 is again answered in the negative and the question whether the content of the memory location PC is less than or equal to zero is also answered in the negative, thus exiting via N and concluding the interrupt program. The programmable control unit 151 again returns to the interrupted program. In the same way, the signal CLK remains 1 during the succeeding 23 interrupt pulses STPU after the STA signal has enabled starting the stepping motor 153. In response to the 24th interrupt pulse STPU the content of the memory location PC becomes equal to 1. The question whether the content of the memory location PC is equal to 1 is now answered in the affirmative and in response thereto the signal CLK is made equal to zero. This concludes the interrupt program in response to the 24th interrupt pulse STPU and the programmable control unit 151 returns to the interrupted program. In response to the 25th interrupt pulse STPU the content of the memory location PC becomes equal to zero. The question whether the content of the memory location PC is equal to 1 is again answered in the negative and the question whether the content of the memory location PC is smaller than or equal to zero is answered in the affirmative. In response, the signal CLK is again made one. It will be seen that the output CLK has been held equal to "1" for 24 interrupt periods, has been set to "0" for one interrupt period and then has been reset to 1. The 0–1 transition at the end of this one period "0" steps the stepping motor 153 one step. The question whether FLBIT is equal to zero is again answered in the affirmative and the address pointer ADPOINT is raised again by 1. The address pointer ADPOINT now points to the next higher memory location which is two places beyond the memory location marked GOAC and the content of that memory location is loaded or stored in memory location PC.

The new number in location PC is less than 25, e.g. 18. The signal CLK remains 1 until the content of the memory location PC is reduced to 1. When this occurs, the signal CLK is again set to "0" for one interrupt period and then returned to "1". The address pointer ADPOINT is again increased by 1 so that the content of the next higher memory location is now stored in the memory location PC. In this way the successive memory locations shown in FIG. 6A are run through until the memory location whose FLBIT is equal to 1 is reached. This memory location contains, for example, the digit 8. This means that in response to the next 6 interrupt pulses STPU after the address pointer has indicated this memory location, the output signal CLK is equal to 1. In response to the 7th interrupt pulse STPU the content of the memory location PC becomes 1 and in response thereto the signal CLK becomes zero. In response to the following 8th interrupt pulse STPU the content of the memory location PC becomes zero in response to which CLK again becomes equal to 1. Since FLBIT is now not equal to zero, the address pointer ADPOINT is not increased by 1 and continues to point to the same memory location containing the number 8. Via the output N of the block "FLBIT=0" the content of this memory location is again stored in the memory location PC. This cycle repeats time after time. The frequency of the 0–1 changeovers in the signal CLK is thus equal to one-eighth of the frequency of the pulses STPU. The stepping motor 153 is thus controlled with pulses whose frequency is one-eighth of the frequency of the pulses STPU. The stepping motor 153 now rotates in synchronism with the pulse generator 150.

Until the block "STO" indicates that the stepping motor 153 should be stopped, the presence of the FLBIT equal to 1 ensures that the address pointer ADPOINT remains unchanged, so that the content of this memory location is again and again stored in the memory location PC. When the control unit 151 receives the signal that the stepping motor 153 is to be stopped, the block "STO" produces a signal on its Y output permitting the address pointer ADPOINT to be increased by 1. The next time the content of the memory location PC is equal to zero, the signal CLK is again made equal to 1 via the output Y of the block "PC≦0", while the question whether FLBIT is equal to zero is again answered in the affirmative since the number containing the flag bit is no longer in memory location ADPOINT. In response thereto, the address pointer ADPOINT is again increased by 1 and the content of the associated memory location is stored in the memory location PC. In the same way as described hereinbefore, the memory locations up to and including the memory location marked STOPDE are now successively indicated by the address pointer ADPOINT. The figures in those memory locations become increasingly larger so that the 0-1 changeovers of the signal CLK occur at ever increasing intervals and the stepping motor 153 decelerates. When the address pointer ADPOINT reaches the memory location STOPDE, the signal CLK no longer changes and the stepping motor 153 stops.

In the foregoing description, the content of the memory location PC is always reduced by 1 until its content equals zero. Other ways of counting are possible within the scope of the invention. One possibility is to continually increase the content of the memory location PC until its content is equal to the content of the memory location addressed by the address pointer ADPOINT.

Referring now to FIG. 9, an indirect electrophotographic copying machine 95 includes an original conveyor 51, an optical section 52, a processing section 53 and a copy section 54.

The original conveyor 51 includes an entry table 61 for receiving an original 60 to be copied. A conveyor track 62 conveys the original 60 past a slit-type exposure window 63. A switch 64 selectively directs the original on a return track 65 to the exposure window 63 or to a receiving tray 66. Conveyor track 62 conveys the original using a number of conveyor rollers 96 driven by a stepping motor 69 maintained in synchronism by toothed belts indicated diagrammatically by dashed lines 97. A pair of conveyor rollers 98 are driven by a stepping motor 71 in cooperation with a sensor 72 for re-positioning the original 60 on each cycle.

The exposure window 63 is illuminated by an illuminating device 73. An optical system, consisting of a movable lens 74, movable mirrors 75 and 76 and a stationary mirror 77, images the portion of the original in the exposure window 63 on a photoconductive medium 78 with one of several imaging ratios.

The photoconductive medium 78 is shown as a drum but this should not be considered limiting the scope of the invention since other embodiments such as, for example, an endless belt or a plate may be used. Photoconductive medium 78 is driven in the direction of an arrow A by a synchronous motor 79.

The processing section 53 includes a charging station 80 in which an electrostatic charge is given to the photoconductive medium 78. An image of the original in the exposure window 63 is projected on the photoconductive medium 78 at an exposure station 81 to form an electrostatic latent image of the original on the photoconductive medium 78 as the original is conveyed past the exposure window 63. The latent image is developed to a visible image in a development station 82. The developed image is transferred from photoconductive medium 78 to a receiving material in an image transfer station 83. Any developer remaining on photoconductive medium 78 after transfer is removed in a cleaning station 84.

FIG. 9 shows only one way in which an electrostatic latent image can be formed, developed and transferred. Other ways of performing these functions are equally within the scope of the invention.

A developed image is transferred in the image transfer station 83 from the photoconductive medium 78 to a receiving material such as, for example, paper which is fed from a supply on a conveyor track 86 in the direction of arrow C. After transfer, the receiving material is conveyed to a fixing device 87 and then discharged on a conveyor track 88 to a receiving tray 89 or on a discharge 90 to other devices (not shown) for further processing.

The copying machine 95 is controlled by a programmable control unit 100, which includes conventional elements such as a central processing unit, inputs and outputs, a memory and an internal control system.

The operation of a program being run by the programmable control unit 100 can be interrupted by interrupt signals applied to an interrupt input of the programmable control unit 100 to give priority treatment to an interrupt program. Only those connecting lines are shown between the programmable control unit 100 and other components which are necessary for an understanding of the invention.

The synchronous motor 79 receives AC power from the mains 102 through a solid-state relay 101. Solid-state relay 101 is controlled by a signal on a line 103 from the programmable control unit 100. A frequency multiplier 104 is also connected to the mains 102. A line 105 from the programmable control unit 100 connects a control input to frequency multiplier 104. The output of the frequency multiplier 104 is a pulse signal whose frequency is a multiple of the frequency of the mains. The multiple provided by the frequency multiplier 104 is adjustable by a signal on the line 105. The output of the frequency multiplier 104 is connected to two stepping motor controllers 106 and 107 of the type described hereinbefore in connection with FIGS. 1-4, and also to an interrupt input INT 1 of the programmable control unit 100. The outputs of the stepping motor controllers 106 and 107 are connected via the power amplifiers 108 and 109 to the stepping motors 69 and 71 respectively.

Sensor 72 is connected to an interrupt input INT of programmable control unit 100. A control panel 110, which can be used inter alia to select a required imaging ratio and to give a start signal, is connected via a line 111 to the programmable control unit 100.

The copying machine 95 operates as follows: The operator provides inputs to the control panel 110 indicating the number of copies of the original 60 to be made, and the imaging ratio to be used. After the original 60 has been placed on the entry table 61, the operator starts the copying process by actuating a control on the control panel 110. In response, the programmable control unit 100 feeds a signal to the solid-state relay 101 via line 103. The solid-state relay 101 connects AC power from the mains 102 to the synchronous motor 79. The synchronous motor 79 begins to rotate at a speed that is directly related to the frequency of the mains 102. As a result, the surface speed of the photoconductive medium 78 is directly related to and synchronous with the mains frequency. The frequency multiplier 104 receives a signal on the line 105 from the programmable control unit 100 which controls the frequence of the output signal of the frequency multiplier 104. The frequency selected is related to the selected imaging ratio as will be explained. The output of the frequency multiplier 104 is phase locked to the frequency of the mains 102 and is fed to the stepping motor controllers 106 and 107. In response to a start signal, the programmable control unit 100 delivers a signal on a line 112 to the stepping motor controller 106 to accelerate the stepping motor 69 to a running speed and to keep it going. The original 60 is then transported by the original conveyor 51 to the nip of conveyor rollers 98. The transport speed of the original 60 in the original conveyor 51 is controlled by the speed of the stepping motor 69. Since the speed of the stepping motor 69 is, in turn, determined by the frequency of the output from the frequency multiplier 104 and since this frequency is a specific multiple phase locked to the frequency of the mains 102, the speed of conveyance of the original 60 is directly related to, and synchronous with, the frequency of the mains 102, as is the surface speed of the photoconductive medium 78. Consequently, the original 60 and the photoconductive medium 78 move in synchronism with one another, the speeds being in inverse proportion to the imaging ratio.

The leading edge of the original 60 is sensed as it passes the sensor 72. The sensor 72 then delivers an interrupt signal to the interrupt input INT of the programmable control unit 100. In response to the interrupt signal from sensor 72, the program being run by the programmable control unit 100 is interrupted and an interrupt program resets a first memory location to zero and enables counting the pulses from the frequency multiplier 104. Each pulse generated by frequency multiplier 104 increases the content of the first memory location by one. Each time the content of this memory location is increased, the content is compared with a fixed number. This fixed number is related to the distance between the sensor 72 and the conveyor rollers 98. If the increased content is smaller than the fixed number, the control unit returns to the interrupted part of the program. When it is equal to the fixed number, the programmable control unit 100 delivers a signal on line 113 to the stepping motor controller 107 which accelerates the stepping motor 71 to running speed and keeps it going.

The relationship between the fixed number and the distance is as follows: Each time the frequency multiplier 104 delivered a predetermined number of pulses, the stepping motor controller 106 delivers a pulse which advances the stepping motor 69 one step through a predetermined angle in response thereto. By means of the toothed belt 97 and conveyor rollers 96 in the original conveyor 51, this rotation through a predetermined angle corresponds to the original 60 being conveyed over a predetermined distance. The distance between the sensor 72 and the conveyor rollers 98 can, therefore, be expressed as the number of pulses delivered by the frequency multiplier 104 to stepping motor controller 106 and to the interrupt input of the programmable control unit 100 which causes the original 60 to be conveyed over this distance. The fixed number is somewhat greater than this latter number of pulses in order to allow the original to form a bulge in front of the conveyor rollers 98. This bulge permits any required lateral shift of the front edge of the original. After the lateral shift, if required, is completed, the programmable control unit 100 delivers the signal at line 113 which starts and runs the stepping motor 71. For great accuracy in positioning the original 60, the stepping motors 69 and 71 have a small angular rotation per step. This requires that the frequency of the stepping motor drive pulses from the circuits 106 and 107 may be too high to accelerate the stepping motors 69 and 71 from a standstill with the required precision. Using the precise control from the programmable control unit 100 and the stepping motor controller 107, the stepping motor 71 is started in a specific manner. As will be apparent from the preceding description, both the position and the speed of the front edge of the original 60 until it is stopped in the nip between the conveyor rollers 98 and afterward, are known with great accuracy. Such accuracy is very important for finally positioning the image on the receiving material with high accuracy. The final speed to be reached by the front edge of the original 60 is, of course, the speed at which the remainder of the original 60 is conveyed through the original conveyor 51. This speed must in all cases be reached before the front edge arrives at the exposure window 63.

As described hereinbefore, the combination of the precisely controlled stepping motors 69 and 71 conveying the original 60 and a synchronous motor (which may, for example, be a stepping motor or any other type of synchronous motor) conveying the photoconductive medium 78 permits synchronizing of the original 60 and the photoconductive medium 78 for each imaging ratio. Consequently, blurring of the image projected by the optical section 52 onto the photoconductive medium 78 is avoided. During transport of the original 60, the latter is imaged in the exposure station 81 onto the photoconductive medium 78 to produce an electrostatic latent image. The electrostatic latent image is then developed in known manner in the development station 82 and transferred to the receiving material in the image transfer station 83. The copy is fixed in the fixing device 87 and deposited in the receiving tray 89 or discharged via discharge 90. Any developing material remaining on the photoconductive medium 78 is removed therefrom in the cleaning station 84. In the meantime, the front edge of the original 60 has passed the exposure window 63 and is conveyed in the direction of the switch 64.

If more than one copy of the original 60 is required and the sensor 72 detects the trailing edge of the original 60 before the leading edge reaches the switch 64, the switch 64 may be set in the position which feeds the original back along the return track 65 to the exposure window 63. If the original is so long that the trailing edge does not pass the sensor 72 before the leading edge reaches the switch 64, the switch 64 discharges the original into the receiving tray 66.

The switch 64 can be controlled in known manner either directly by time or distance measurement, or by a length measurement derived, for example, by counting the pulses from the frequency multiplier 104 in the programmable control unit 100 during passage of the original past the sensor 72.

When the sensor 72 detects the rear edge of the original 60, it delivers an interrupt signal to the programmable control unit 100 which sets the content of a second memory location to zero. In response to each succeeding pulse from the frequency multiplier 104, the content of the second memory location is increased by one until at least a second number of pulses has been counted. This number may or may not be equal to the fixed number referred to hereinbefore, because the sensor 72 may include two separate sensing elements disposed at unequal distances from the conveying rollers 98 for detecting the front edge and the rear edge of the original 60. After the second number of pulses has been counted, the programmable control unit 100 delivers a signal to the stepping motor controller 107 via the line 113 to decelerate and stop the stepping motor 71. Since the conveyor rollers 98 do not have any effect after the rear edge of the original has passed, it is unimportant how the stepping motor 71 is stopped. However, in order to avoid a sudden jolt that might occur if the stepping motor 71 and the conveying rollers 98 were abruptly stopped, it is advantageous to decelerate and stop the stepping motor 71 in a specific manner as described in connection with FIGS. 1-8.

Simultaneously with the generation of the control signal on the line 113 to start the stepping motor 71 and keep it going, the content of a third memory location is set to zero and increased by one in response to each pulse originating from the frequency multiplier 104. The content of the third memory location is compared with a third number corresponding to the length of the return track 65 expressed as the number of pulses that must be fed to the stepping motor 71 to transport the original 60 around the return track 65 and stop it with its front edge forming a bulge in the nip of the conveyor rollers 98. The third memory may thus be used to reposition the original for producing multiple copies. Instead of using a third memory, the content of the first memory location already mentioned may be compared not only with the first fixed number corresponding to the distance between the sensor 72 and the conveyor rollers 98, but also with a second fixed number indicating the length of the return track 65 expressed as a number of pulses. Each time the content of the first memory location is equal to the second fixed number, the content of the first memory location is reset to zero. In response to each pulse originating from frequency multiplier 104, the content of the first memory location is again increased by one. Since the length of the return track is constant and since the conveyance is synchronized with pulses originating from the frequency multiplier 104, the same fixed number can be re-used on each passage of the original 60. As a result of the synchronization achieved in this way, the sensor 72 need detect the front and rear edges only during the first passage of the original 60 and not again on subsequent passages.

The conveyor rollers 98 can be stopped in each cycle either shortly after the rear edge of the original 60 has passed, in which case, the length of the original 60 must be measured, or just before the front edge reaches the nip between the conveyor rollers 98, in which case, only the length of the return track need be known. After the required number of copies have been made, the original 60 is deposited via the switch 64 in the receiving tray 66, the stepping motors 69 and 71 are stopped and the solid-state relay 101 is switched off to thus deenergize and stop the synchronous motor 79.

As a result of the synchronization between the conveyance of the original 60 by means of stepping motors 69 and 71 and the conveyance of the photoconductive medium 78 by means of the synchronous motor 79, it is unnecessary to use separate pulse generators driven by the original 60 and the photoconductive medium 78. It is sufficient to count the pulses originating from the frequency multiplier 104. Thus, the frequency multiplier 104 forms one independent source for generating interrupt signals for the programmable control unit 100 both for controlling the processing stations along the path of the photoconductive medium 78 and for the conveyance of the original 60. The frequency at which the frequency multiplier 104 generates pulses in the example described is dependent upon the imaging ratio selected. In the processing section 53 and the copy section 54, the interrupt pulses do not represent a single fixed distance, but instead represent a different fixed distance for each imaging ratio.

Several alternative ways may be employed for generating the numbers representative of length of travel and for producing pulses to be counted. One of the ways, shown in FIG. 11, employs a frequency divider 115 whose division ratio can be controlled according to the selected imaging ratio by a signal on a line 116 from the programmable control unit 100. The output of the frequency divider 115 is applied on a line 117 to the programmable control unit. The signal on the line 116 to frequency divider 115 may be operative to enable operation of one of a plurality of electronic dividers (not shown) in the frequency divider 115 in a manner similar to a 3-way switch 130 described hereinafter with respect to FIG. 10.

Another way is to store fixed sets of numbers in a ROM in the programmable control unit 100. Then, when an imaging ratio is selected, each of the fixed set of numbers is multiplied by a factor which corrects for the imaging ratio. During the copying cycle, the corrected numbers are stored in memories and used as the fixed numbers with which the contents are compared.

Referring now to FIG. 10, an embodiment of the frequency multiplier 104 includes a transformer 121 receiving AC power from the mains 102 and feeding full wave rectifier 122. The full wave rectifier 122 applies a signal to a band-pass filter 123 having a center frequency which is twice the nominal frequency of the mains 102. The output of the band-pass filter 123 is connected to a first input of a phase locked loop consisting of a phase comparator 124, a voltage-controlled oscillator 125 and three series frequency dividers 127, 128 and 129. Conventionally, a low-pass filter (not shown) is employed between the phase comparator 124 and the voltage-controlled oscillator 125 to attenuate undesired high frequencies. The output of the voltage-controlled oscillator 125 is connected both to a 41-divider 126 and to the 29-divider 127. The output of the 29-divider 127 is connected to the 2-divider 128, the output of which is connected via a divider 129 to the second input of the phase comparator 124. The outputs of the dividers 126, 127 and 128 are respectively connected to the three inputs of an electronic 3-way switch 130. The divided frequency fed from the divider 129 to the input of the phase comparator 124 has a frequency and phase that are maintained locked to the frequency and phase of the filtered signal from the band-pass filter 123. To maintain this relationship, the voltage controlled oscillator 125 is controlled to generate a frequency that is equal to the frequency from the band-pass filter 123 times the product of the division ratios of the dividers 127, 128 and 129.

Line 105 from control unit 100 to a control input of switch 130 is, in fact, three lines 105-a, 105-b, 105-c, one of which always carries a signal. In response to these signals, the 3-way switch 130 connects to its output a frequency from one of divider 126, divider 127, or divider 128. The output of 3-way switch 130 is connected to the interrupt input INT 1 of the control unit 100 and to the input of stepping motor controllers 106 and 107. Stepping motor controllers 106 and 107 receive control signals from the control unit 100 on lines 112 and 113, respectively. The control unit 100 thus performs the function of the signal source 45 of FIG. 2. Stepping motor controllers 106 and 107 are connected in the manner previously described to the stepping motors 69 and 71 respectively via the power amplifiers 108 and 109 respectively.

The transformer 121 transforms the mains voltage to a low AC voltage of the same frequency. The full-wave rectifier 122 rectifies this AC voltage to produce a pulsating DC voltage at a frequency twice that of the mains frequency. The band-pass filter 123 removes undesirable frequencies from the pulsating DC voltage before it is compared in the phase comparator 124 with the output signal of divider 129. The output signal of phase comparator 124 controls the frequency and phase of the oscillator 125 so that the latter delivers an AC voltage or a pulsating DC voltage at a frequency which when divided successively by 29, 2 and by the division ratio of the divider 129 produces a signal having a frequency equal to twice the mains frequency. The ratio of the frequencies of the dividers 126 and 127 is approximately 1.414, that is, approximately $\sqrt{2}$. The outputs of the dividers 128, 126 and 127 thus deliver signals whose frequencies are in the ratio of $1:\sqrt{2}:2$ corresponding to imaging ratios of 1:1, $1:\sqrt{2}$ and 1:2 for the copying machine 95. If the copying machine 95 has other imaging ratios, a signal with the associated frequency can easily be generated by adding and adapting the dividers between the output of the oscillator 125 and the second input of circuit 124.

The invention is described hereinbefore by reference to its use in a copying machine operating by the indirect electrophotographic process. It will be understood that the invention is not restricted to this type of copying machines and that the invention can be used with the same advantages in copying machines operating by one of the numerous other known processes enabling one or more copies to be made from an original.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A copying machine comprising:
an image receiving medium;
first transport means including a synchronous motor responsive to current having a substantially constant first frequency from an AC power source for transporting said receiving medium at a first speed proportional to the frequency of said source current;
second transport means including at least one other synchronous motor for transporting an original along a path for imaging the original;
an optical system for producing an image of an original in said path onto said receiving medium;
means for generating in response to an AC component from said source signal pulses having a second frequency always proportional to said first frequency; and
control means for supplying to a said other synchronous motor control pulses integrally related in frequency to said signal pulses so that said second transport means will transport an original along said path at a second speed proportional to said second frequency;
said optical system having at least one imaging ratio for each of which a corresponding relationship is establishable between said first frequency and said second frequency and consequently between said first speed and said second speed.

2. A copying machine according to claim 1, wherein said at least one other synchronous motor comprises at least one stepping motor, said stepping motor being effective to advance one step of a predetermined value in response to each pulse of said control pulses.

3. A copying machine according to claim 2, wherein said means for supplying control pulses includes a stepping motor controller, said stepping motor controller being operative in response to said signal pulses to produce control pulses at intervals integrally related to but differing from said second frequency during at least one of starting and stopping of said stepping motor.

4. A copying machine according to claim 1, wherein said AC power source is an alternating current mains.

5. A copying machine according to claim 1, 2, or 4, wherein said means for generating signal pulses include a frequency multiplier effective to produce said signal pulses with at least one frequency that is an integral multiple of said first frequency.

6. A copying machine according to claim 5, wherein said optical system has at least first and second imaging ratios and said means for generating signal pulses includes means for producing a third frequency associated with said first imaging ratio and a fourth frequency associated with said second imaging ratio, a ratio of said first imaging ratio to said second imaging ratio being equal to a ratio of said fourth frequency to said third frequency.

7. A copying machine according to claim 6, wherein said means for generating signal pulses includes a phase lock loop that is phase locked to a multiple of said first frequency, said phase locked loop being effective to produce a fifth frequency higher than said first, second, third or fourth frequencies and integrally related to said first frequency, and means for dividing said fifth frequency to produce at least said third and fourth frequencies.

8. A copying machine according to claim 1, 2 or 4, wherein said path includes at least one fixed length for a copying cycle, said second transport means being effective to transport said original a predetermined increment of length per cycle of said second frequency, said fixed length being traversed by said original in a predetermined number of said increments, said machine further comprising control means including a counter effective to count cycles of said second frequency and means for comparing a content of said counter with said predetermined number to determine a time for an event.

9. A copying machine according to claim 8, wherein said second transport means includes a first synchronous motor controlled by a first pulse signal related to said second frequency, a second synchronous motor controlled by a second pulse signal related to said second frequency, a sensor in said path effective to sense at least a leading edge of said original, and a pair of conveyor rollers in said path disposed a predetermined distance downstream of said sensor, said second synchronous motor being effective to drive said conveyor rollers, said predetermined number being related to a distance on said path between said sensor and said conveyor rollers and said event is a starting of said second synchronous motor for driving said conveyor rollers.

10. A copying machine comprising:
a programmable control unit for controlling operations of the copying machine, said programmable control unit having interrupt inputs and being responsive to an interrupt pulse applied to one of said interrupt inputs to interrupt a current program and process an interrupt program;
an image receiving medium;
means for producing from current of an AC power source having a substantially constant frequency signal pulses having a second frequency different from and always proportional to said source current frequency;

first transport means response to an AC voltage from said source for transporting said receiving medium at a speed proportional to said source current frequency;

second transport means operable in response to said signal pulses for transporting an original along an imaging path at a speed proportional to said second frequency;

means for generating and applying to said one interrupt input at least one interrupt pulse in response to a sensed presence of an original for being transported in said path, and means for applying to another of said interrupt inputs interrupt pulses having a frequency proportional to the frequency of said signal pulses, whereby said programmable control unit controls operations of said copying machine in response to interrupt pulses that are synchronized to the transport speeds of both the image receiving material and the original.

11. A copying machine, comprising:

an imaging surface;

a synchronous motor for transporting said imaging surface at a first speed synchronously with a first frequency of a supply voltage;

an original transport effective to transport an original on a path;

a stepping motor responsive to a pulse signal having a second frequency to drive said original transport at a second speed;

an optical system for imaging said original on said imaging surface;

a pulse generator effective to produce said pulse signal at said second frequency having an integral relationship to said first frequency;

a stepping motor controller effective to modify a frequency of said pulse signal at least during one of starting and stopping said stepping motor;

said optical system having at least one imaging ratio;

a relationship between said first frequency and said second frequency being related to said imaging ratio, whereby an image is stationary with respect to said imaging surface;

a control unit; and means in said control unit for counting pulses of said pulse signal and for controlling at least one function in response to said counting.

12. A method of controlling transport of an imaging surface and an original in a copying machine, comprising:

transporting said imaging surface at a first speed in response to a voltage and synchronously with the frequency of current from an AC power source;

generating in response to an AC component from said source signal pulses having a second frequency always proportional to said source current frequency;

transporting said original in response to and synchronously with said signal pulses, at a second speed proportional to said second frequency; and imaging said original on said imaging surface at an imaging ratio proportional to the ratio of said second frequency to said source current frequency.

13. A method according to claim 12, said source current being that of an AC mains.

14. A method according to claim 12 or 13, and wherein operations of the copying machine are controlled via a programmable control unit that has first and second interrupt inputs and is responsive to an interrupt pulse applied to said second interrupt input to interrupt a current program and process an interrupt program, said method further comprising:

applying to said first interrupt input interrupt pulses proportional in frequency to said signal pulses and thus proportional to the respective transport speeds of said imaging surface and said original;

producing for and applying to said second interrupt input an interrupt signal in response to a sensed presence in the machine of an original to be copied and thus activating a said interrupt program; and during said interrupt program counting said interrupt pulses and controlling durations of said transporting steps on the basis of counts of said interrupt pulses.

* * * * *